United States Patent
Sasaki

(10) Patent No.: US 9,436,252 B2
(45) Date of Patent: Sep. 6, 2016

(54) SEMICONDUCTOR INTEGRATED CIRCUIT AND CONTROL METHOD OF SEMICONDUCTOR INTEGRATED CIRCUIT

(75) Inventor: Mitsuru Sasaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 500 days.

(21) Appl. No.: 13/611,151

(22) Filed: Sep. 12, 2012

(65) Prior Publication Data

US 2013/0103980 A1    Apr. 25, 2013

(30) Foreign Application Priority Data

Oct. 24, 2011    (JP) .................................. 2011-233262

(51) Int. Cl.
*G06F 1/00* (2006.01)
*G06F 1/26* (2006.01)
*G06F 1/32* (2006.01)
*G06F 11/20* (2006.01)
*G06F 11/14* (2006.01)

(52) U.S. Cl.
CPC .............. *G06F 1/3203* (2013.01); *G06F 1/26* (2013.01); *G06F 11/14* (2013.01); *G06F 11/20* (2013.01)

(58) Field of Classification Search
CPC .................................. G06F 1/32; G06F 1/26
USPC .................................................. 713/300, 340
See application file for complete search history.

(56) References Cited

U.S. PATENT DOCUMENTS

| | | | |
|---|---|---|---|
| 5,808,693 A * | 9/1998 | Yamashita ............... | H04N 5/63 345/211 |
| 7,142,996 B2 * | 11/2006 | Patel et al. ....................... | 702/64 |
| 8,250,394 B2 * | 8/2012 | Agrawal ....................... | 713/322 |
| 2008/0307238 A1 * | 12/2008 | Bieswanger et al. ......... | 713/300 |
| 2009/0249103 A1 * | 10/2009 | Jeyaseelan et al. .......... | 713/324 |
| 2010/0023790 A1 * | 1/2010 | Cooper et al. ................ | 713/322 |
| 2011/0173474 A1 * | 7/2011 | Salsbery et al. .............. | 713/323 |
| 2011/0235133 A1 * | 9/2011 | Saiki .................. | G03G 15/5004 358/474 |
| 2011/0252245 A1 * | 10/2011 | Lai ............................... | 713/300 |

(Continued)

FOREIGN PATENT DOCUMENTS

| | | |
|---|---|---|
| JP | 2007-259463 | 10/2007 |
| JP | 2008-040543 | 2/2008 |

(Continued)

OTHER PUBLICATIONS

Office Action issued Sep. 7, 2015 in counterpart Japanese patent application 2011-233262, with translation.

*Primary Examiner* — Phil Nguyen
(74) *Attorney, Agent, or Firm* — Fitzpatrick, Cella, Harper & Scinto

(57) ABSTRACT

A semiconductor integrated circuit provided with a processing unit that repeats a processing state and a standby state, comprises an obtaining unit configured to obtain a period of the standby state as a standby period; and a control unit configured to hold a plurality of candidate voltages in association with pieces of recovery information corresponding to recovery times required for the processing unit to return to a normal operation voltage from the candidate voltages in the standby state, and to control a standby voltage of the processing unit in the standby state in accordance with the candidate voltage associated with the piece of recovery information corresponding to a recovery time that is shorter than the standby period among the plurality of candidate voltages.

6 Claims, 14 Drawing Sheets

(56) References Cited

U.S. PATENT DOCUMENTS

2012/0166843 A1* 6/2012 Muralidhar ........... G06F 1/3203 713/323
2013/0007492 A1* 1/2013 Sokol et al. ................. 713/322

FOREIGN PATENT DOCUMENTS

JP 2008-072566 3/2008
JP 2010-113641 5/2010

* cited by examiner

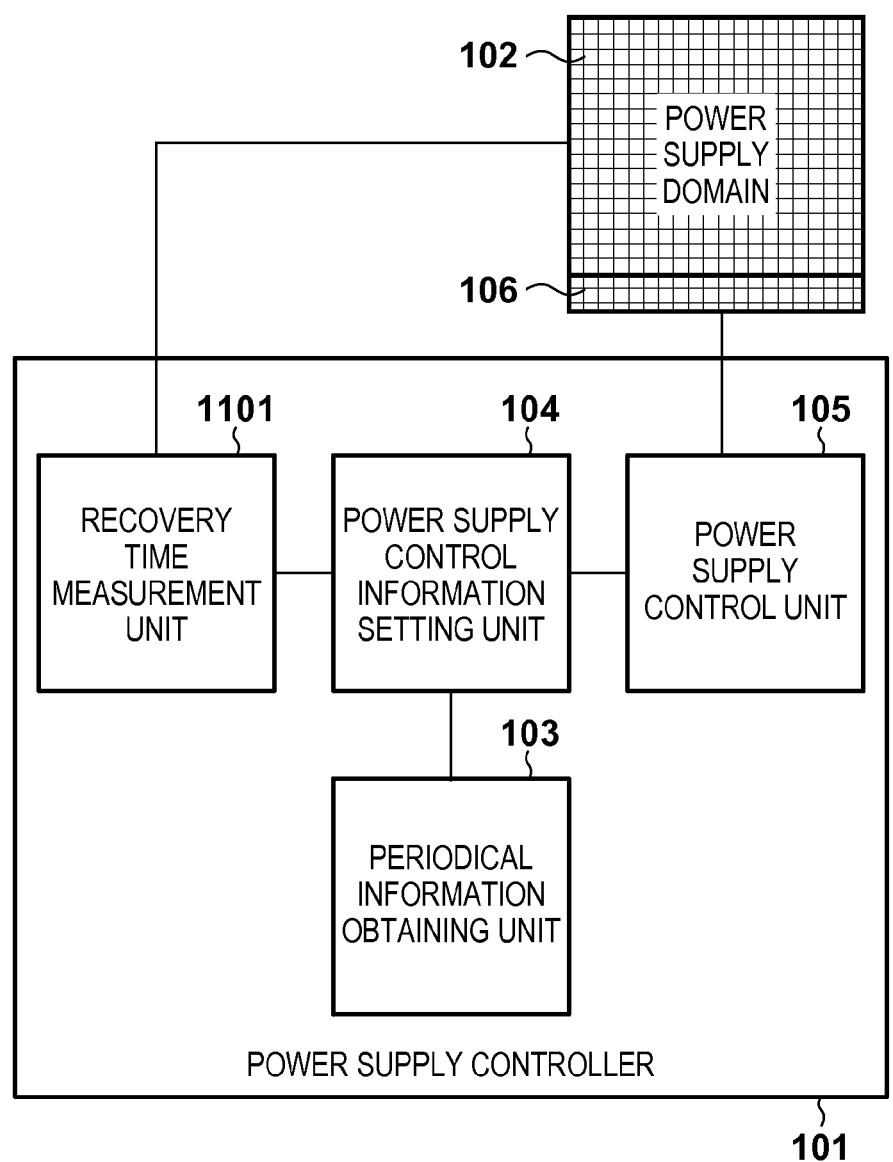
F I G. 11

SEMICONDUCTOR INTEGRATED CIRCUIT AND CONTROL METHOD OF SEMICONDUCTOR INTEGRATED CIRCUIT

BACKGROUND OF THE INVENTION

1. Field of the Invention

The present invention relates to a semiconductor integrated circuit and a control method of a semiconductor integrated circuit, and more particularly to a technique for reducing the power of a semiconductor integrated circuit having periodicity in processing such as image processing and audio processing.

2. Description of the Related Art

In recent years, semiconductor integrated circuits have been used in complex processing such as high definition image processing. Power consumption tends to increase the more complex the processing. Also, reduction of power consumption is also important from the aspect of heat resistance and reliability.

The power consumption of a semiconductor integrated circuit is divided between power consumption in a processing state and power consumption in a standby state. Of these, power consumption in the standby state is dependent on leakage current in a MOS transistor, for example. Leakage current is current that leaks into channels or places that are insulated when the MOS transistor is OFF.

Power gating is known as a technique for reducing power consumption in the standby state. Power gating is a technique for shutting down power supply to a functional block of circuitry that is non-operational in the standby state (hereinafter, "power shutdown"). A power switch transistor is provided between the power supply and the functional block to be power gated, and in the standby state the power switch transistor is turned OFF and power to the functional block to be power gated is shut down. As a result, the leakage current of that functional block is greatly reduced, and power consumption in the standby state is reduced.

However, with power gating, once power supply has been shut down, it takes time to activate the MOS transistor and return the circuitry to an operational state after power supply is restarted. While returning a MOS transistor constituting circuitry to an operational state takes several microseconds after power supply is applied, power needs to be supplied gradually so as to not affect the operation of peripheral circuitry. This recovery time depends on the method of supplying power to the functional blocks, the structure of the power switch and individual differences between semiconductors, and power gating needs to be applied after setting an appropriate duration. For this reason, conventionally power gating has only been used in relation to the standby state, in which it is known that the functional blocks will be out of use for long enough for the recovery time to not be an issue, and, moreover, in which processing will not be disrupted.

For example, with a mobile phone, functional blocks that are not used when waiting for a call such as functional blocks related to making a call can enter a standby state involving power shutdown. Such power supply control is implemented with system levels using register settings, dedicated commands, interrupts or the like as disclosed in Japanese Patent Laid-Open No. 2007-259463.

Also, as disclosed in Japanese Patent Laid-Open No. 2008-40543 or Japanese Patent Laid-Open No. 2008-72566, a method for detecting whether a transistor constituting circuitry is in an operational state by performing processing such as monitoring the voltage state or calculating the time required for recovery is adopted when performing power gating. This method enables timing control of power gating that takes recovery time into consideration.

On the other hand, in image processing and audio processing, signal standards have timing rules, and each standard is characterized by periodically repeating a processing state and an idle state in which processing is not performed. For example, in image processing, horizontal processing and vertical processing each involve repeating a processing state and an idle state periodically in accordance with the timing of a signal standard. Also, processing such as image partition processing and frame processing similarly has periodicity, and involves repeating a processing state and an idle state. Typically, the idle state is often shorter than the recovery time from a power shutdown state, and is not suitable for power shutdown even if the timing and duration of the idle state are predicable. Accordingly, a situation arises where power to circuitry is not shutdown even in the idle state, and power savings are not achieved when performing image processing.

In order to respond to such a situation, it is conceivable to shorten the recovery time by voltage reduction to a specific voltage rather than power shutdown. However, there is a problem in that when the voltage reduction duration is set so that the recovery time fits within the time interval of the shortest idle state in order to be compatible with various signal standards, the voltage cannot be sufficiently transformed, resulting in insufficient reduction in leakage current.

SUMMARY OF THE INVENTION

In consideration of the above problems, the present invention provides a technique for performing power supply control tailored to an idle state whose timing and duration change with differences between various periodicities and achieving low power consumption, in a semiconductor integrated circuit that handles processing of diverse signal standards.

According to one aspect of the present invention, there is provided a semiconductor integrated circuit provided with a processing unit that repeats a processing state and a standby state, comprising: an obtaining unit configured to obtain a period of the standby state as a standby period; and a control unit configured to hold a plurality of candidate voltages in association with pieces of recovery information corresponding to recovery times required for the processing unit to return to a normal operation voltage from the candidate voltages in the standby state, and to control a standby voltage of the processing unit in the standby state in accordance with the candidate voltage associated with the piece of recovery information corresponding to a recovery time that is shorter than the standby period among the plurality of candidate voltages.

According to one aspect of the present invention, there is provided a control method of a semiconductor integrated circuit provided with a processing unit that repeats a processing state and a standby state, comprising: obtaining a period of the standby state as a standby period, and holding a plurality of candidate voltages in association with pieces of recovery information corresponding to recovery times required for the processing unit to return to a normal operation voltage from the candidate voltages in the standby state, and controlling a standby voltage of the processing unit in the standby state in accordance with the candidate voltage associated with the recovery information corresponding to a recovery time that is shorter than the standby period among the plurality of candidate voltages.

Further features of the present invention will be apparent from the following description of exemplary embodiments with reference to the attached drawings.

BRIEF DESCRIPTION OF THE DRAWINGS

FIG. 11 is a diagram showing a configuration of a power supply control mechanism according to a second embodiment.

DESCRIPTION OF THE EMBODIMENTS

Figure 1:
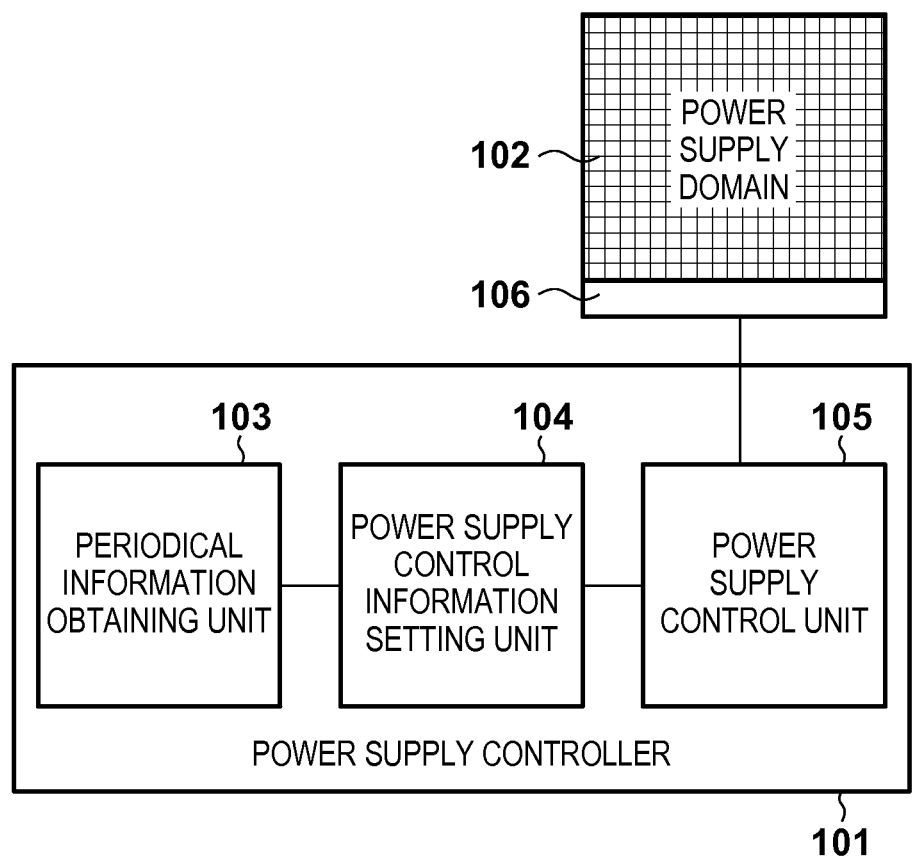
FIG. 1 is a diagram showing a configuration of a power supply control mechanism according to a first embodiment that is for controlling the power supply of a semiconductor integrated circuit.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

The configuration of a power supply control mechanism according to a first embodiment that is for controlling the power supply of a semiconductor integrated circuit will be described, with reference to FIG. 1. The power supply control mechanism according to the present embodiment is provided with a power supply controller 101, a power supply domain 102, and a power switch 106. The power supply controller 101 functions as a power supply control apparatus that controls the voltage of the power supply domain 102 by controlling the power supply domain 102 via the power switch 106.

The power supply controller 101 is provided with a periodical information obtaining unit 103, a power supply control information setting unit 104, and a power supply control unit 105.

The periodical information obtaining unit 103 obtains one or more types of information relating to the periodical characteristics of processing to be implemented. The power supply control information setting unit 104 sets the power supply voltage of a standby state according to the length of the recovery time required for the power supply domain 102 to return from the standby voltage to a voltage at which circuitry is operational, based on the information relating to the periodical characteristics of the processing to be implemented, and holds the set power supply voltage as power supply control information. The power supply control unit 105 controls the standby voltage of the power supply domain 102, in accordance with the power supply control information set by the power supply control information setting unit 104.

The configuration of the power supply control mechanism according to the first embodiment that is for controlling the power supply of a conventional semiconductor integrated circuit will be described, with reference to FIG. 2. As shown in FIG. 2, the conventional power supply controller 201 is provided with a power supply control information setting unit 104 and a power supply control unit 105. Conventionally, the power supply control information setting unit 104 performs power supply control by directly controlling system levels using register settings, dedicated commands, interrupts or the like, and does not have the configuration of a periodical information obtaining unit 103 such as that shown in FIG. 1.

Figure 2:
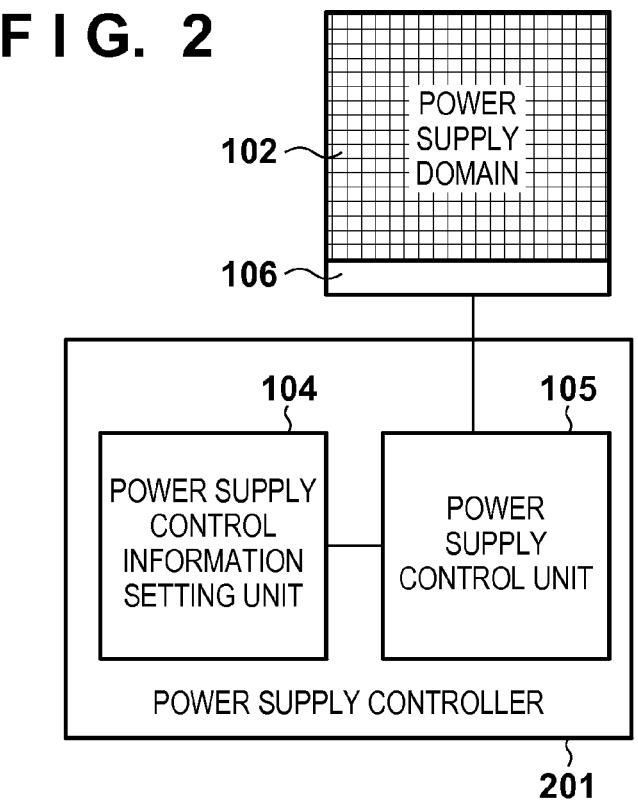
FIG. 2 is a diagram showing a configuration of a conventional power supply control mechanism.
Figure 3:
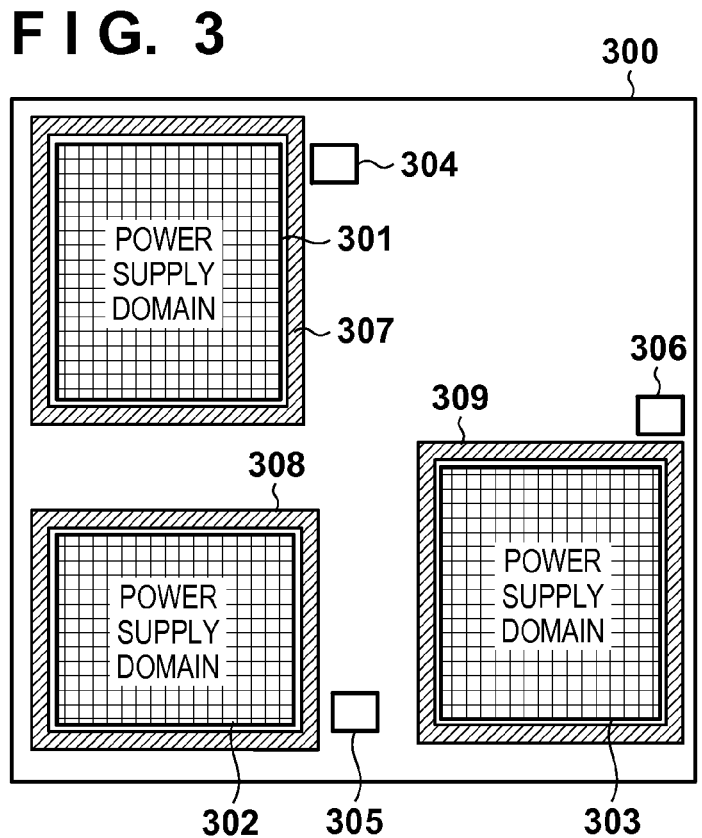
FIG. 3 is a diagram showing exemplary mounting of a power supply control mechanism in a semiconductor integrated circuit.

FIG. 3 shows an example in which power supply controllers, power supply domains and power switches inside a semiconductor integrated circuit are mounted in accordance with a floor plan that can be commonly used with the power supply control mechanism of FIG. 1 or FIG. 2.

In FIG. 3, three power supply domains consisting of a power supply domain 301, a power supply domain 302 and a power supply domain 303 exist inside a semiconductor integrated circuit 300. Also, a power supply controller 304, a power supply controller 305 and a power supply controller 306 are disposed in correspondence to the respective power supply domains. Furthermore, the power switch controlled by each power supply controller is the power switch 106 shown in FIG. 1, and is disposed as a power switch 307, a power switch 308 and a power switch 309 so as to surround the respective power supply domains. Note that although exemplary mounting of a ring-type power switch surrounding the respective power supply domains is shown in FIG. 3, the power switch need not be a specific type of power switch, and may be another type of power switch.

Figure 4:
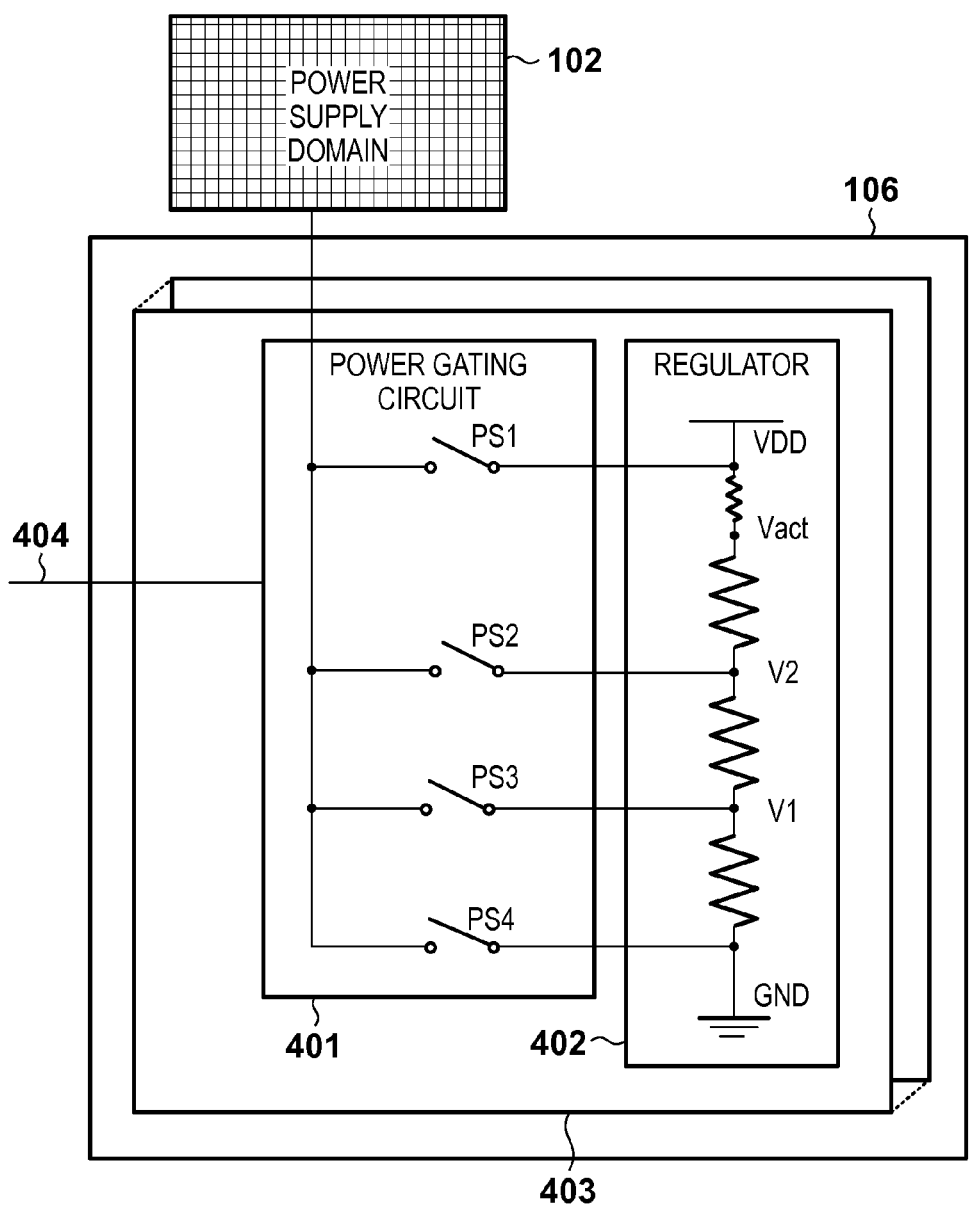
FIG. 4 is a diagram showing an exemplary configuration of a power switch.

An example will be described in which the power switch 106 shown in FIG. 1 is mounted as the power switch 307, the power switch 308 and the power switch 309 in FIG. 3, with reference to FIG. 4.

The power switch 106 is formed as a result of a plurality of power gating cells 403 being instantiated. The individual power gating cells 403 are provided with a power gating circuit 401 and a regulator 402.

The power gating circuit 401 is provided with a switch PS1, a switch PS2, a switch PS3, and a switch PS4. The switch PS1 is used for power supply in a processing state, and the switches PS2 to PS4 are used for voltage setting in a standby state. The regulator 402 performs control so as to always keep output voltage/current constant. Also, power supply control information 404 is used as information for instructing the switches PS1 to PS4 with which the individual power gating circuits 401 are provided.

Note that at the time of power supply to the power supply domains, only the power gating circuit 401 is essential, and any mounting configuration of the regulator 402 is acceptable. Also, although the regulator 402 is included inside the power gating cell 403 in FIG. 4, required power may be supplied from outside the power gating cell 403 or from outside the semiconductor integrated circuit.

Figure 5:
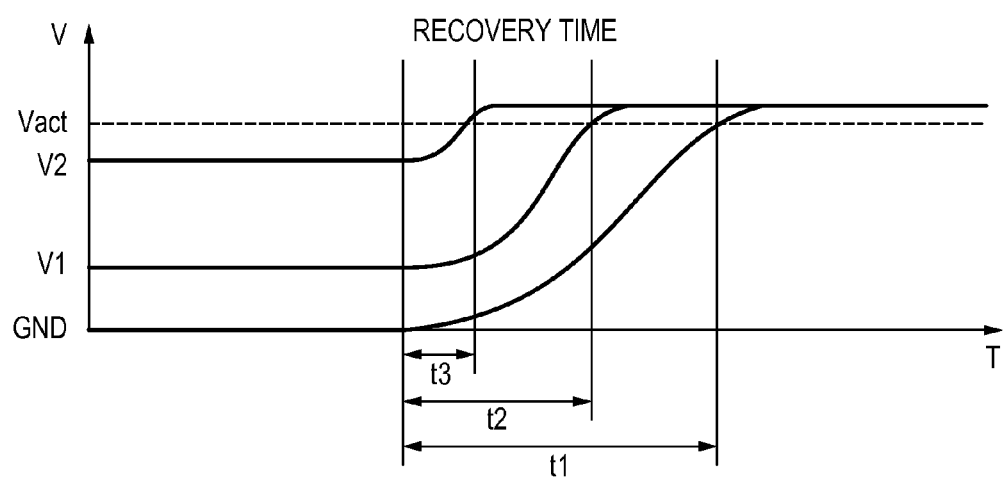
FIG. 5 is a diagram illustrating recovery times from standby voltages.

In the example in FIG. 3, the power switch 307, the power switch 308 and the power switch 309 are constituted by disposing a plurality of power gating cells 403 in a ring shape. The recovery time required to reach a voltage Vact at which the circuitry is operational after starting supply of voltage for respective standby voltages in the case where the voltages of the standby state are given respectively as GND, V1 and V2 will be described, with reference to FIG. 5. In FIG. 5, the vertical axis shows voltage V and the horizontal axis shows time T. A recovery time t1 is the time required to reach the voltage Vact from the standby voltage GND. Similarly, a recovery time t2 is the time required to reach the voltage Vact from the standby voltage V1, and a recovery time t3 is the time required to reach the voltage Vact from the standby voltage V2. The standby voltages corresponding to these times t1 to t3 serve as standby voltage candidates to be set in the power supply domain. As shown in FIG. 5, the recovery time t1 from the standby voltage GND is the longest, the recovery time t2 from the standby voltage V1 is the next longest, and the recovery time t3 from the standby voltage V2 is the shortest. Note that although three standby voltages are described in the example in FIG. 5, the number of standby voltages is dependent on the regulator and power supply domain configuration, and is not restricted. Also, there is similarly no restriction in relation to the values that the standby voltages can take.

Figure 6:
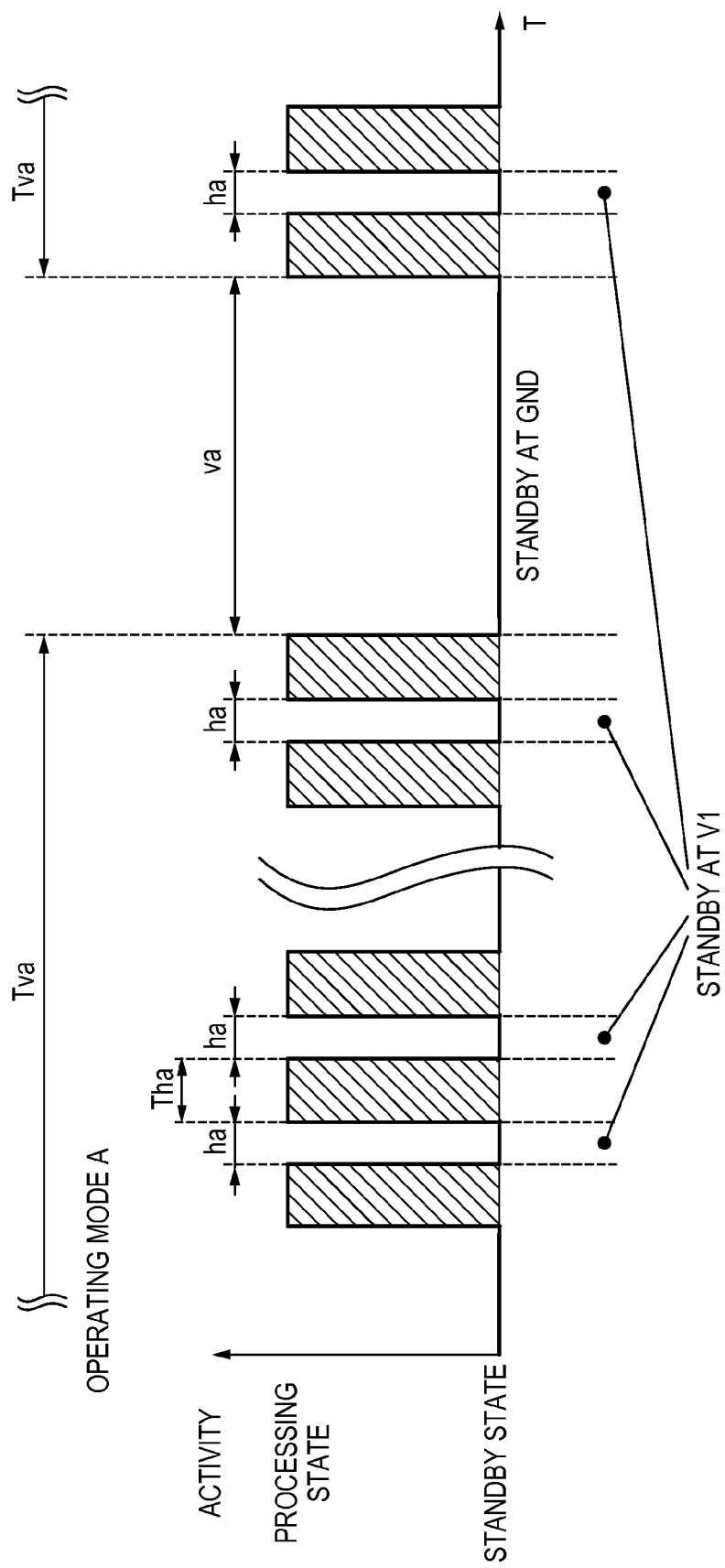
FIG. 6 is a diagram showing an operating state of an operating mode A.

FIG. 6 shows the time interval between the processing state and the standby state in an operating mode A. Assumed that processing in the operating mode A is image processing of HD video, an occurrence period of the idle state (standby state) of horizontal synchronization is Tha, and an occurrence period of the idle state (standby state) of vertical synchronization is Tva. The idle state of horizontal synchronization occurs for the occurrence period Tha at occurrence intervals ha. Similarly, the idle state of vertical synchronization occurs for the occurrence period Tva at occurrence intervals va.

Here, the occurrence period Tha is assumed to have the relationship shown in equation (1).

$$t2 < Tha < t1 \tag{1}$$

In this case, given that the occurrence period Tha is longer than the recovery time t2 from the standby voltage V1, the standby state of the standby voltage V1 can be set for the occurrence period Tha of the idle state.

Similarly, the occurrence period Tva is assumed to have the relationship shown in equation (2).

$$t1 < Tva \tag{2}$$

In this case, given that the occurrence period Tva is longer than the recovery time t1 from the standby voltage GND, the standby state at the standby voltage GND can be set for the occurrence period Tva of the idle state. That is, a standby state involving power shutdown can be set.

Figure 7:
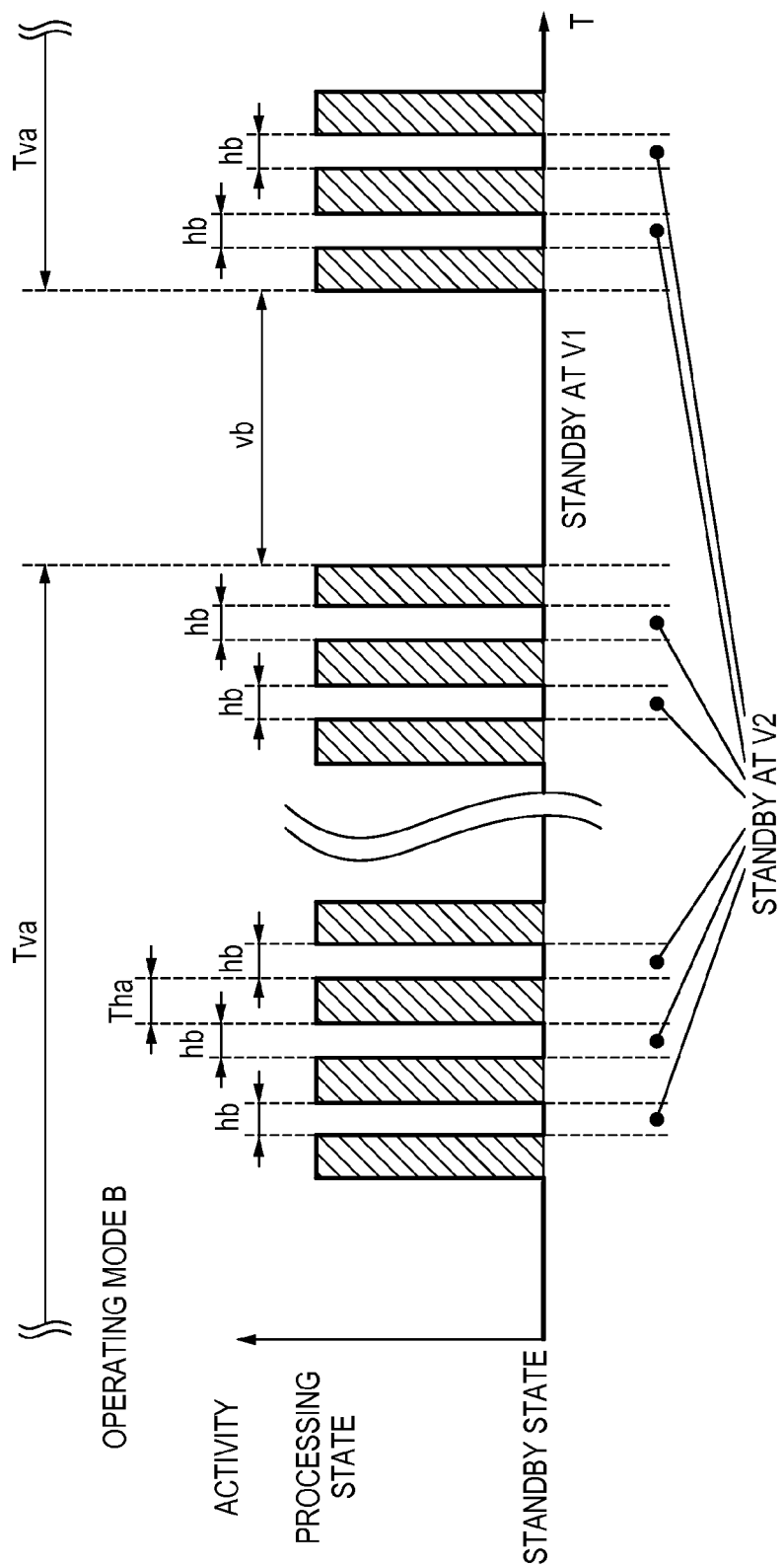
FIG. 7 is a diagram showing an operating state of an operating mode B.

On the other hand, FIG. 7 shows the time intervals of the processing state and the standby state in an operating mode B. Assume that processing in the operating mode B is image processing of SD video with a large number of frames, the occurrence period of the idle state (standby state) of horizontal synchronization is Thb, and the occurrence period of the idle state (standby state) of vertical synchronization is Tvb. The idle state of horizontal synchronization occurs for the occurrence period Thb at intervals hb. Similarly, the idle state of vertical synchronization occurs for the occurrence period Tvb at intervals vb.

Here, the occurrence period Thb is assumed to have the relationship shown in equation (3).

$$t3 < Thb < t2 \tag{3}$$

In this case, given that the occurrence period Thb is longer than the recovery time t3 from the standby voltage V2, the standby state of the standby voltage V2 can be set for the occurrence period Thb of the idle state.

Similarly, the occurrence period Tvb is assumed to have the relationship shown in equation (2).

$$t2 < Tvb < t1 \tag{4}$$

In this case, given that the occurrence period Tvb is longer than the recovery time t2 from the standby voltage V1, the standby state of the standby voltage V1 can be set for the occurrence period Tvb of the idle state.

As described above, respectively different standby voltages can be set for Tha of FIG. 6 and Thb of FIG. 7, and for Tva of FIG. 6 and Tvb of FIG. 7. Appropriate standby voltages for reducing leakage current can thus be respectively set for Tha and Tva in the operating mode A and for Thb and Tvb in the operating mode B, in correspondence to the occurrence periods and occurrence intervals of the idle states.

An exemplary configuration of the periodical information obtaining unit 103 shown in FIG. 1 will be described, with reference to FIG. 8. The periodical information obtaining unit 103 is provided with a periodical information obtaining unit 801 and a periodical information obtaining unit 802, in order to enable two types of periodical information to be obtained.

These two periodical information obtaining units obtain a signal 803 having periodical characteristics, such as a video signal, from outside, and obtain periodical information relating to idle states having respectively different periodicities.

For example, assume that processing having periodicity such as the operating mode A shown in FIG. 6 is executed. In this case, the periodical information obtaining unit 801 obtains the periodical characteristics of the occurrence period Tha of the idle state from the signal 803, and outputs the obtained periodical characteristics to the downstream power supply control information setting unit 104 as periodical information 804. Similarly, the periodical information obtaining unit 802 obtains the periodical characteristics of the occurrence period Tva of the idle state, and outputs the obtained periodical characteristics to the downstream power supply control information setting unit 104 as periodical information 805.

Also, assume that the processing is changed from processing having periodicity such as the operating mode A shown in FIG. 6 to processing having periodicity such as the mode B shown in FIG. 7. In this case, the periodical information obtaining unit 801 obtains the periodical characteristics of the occurrence period Thb of the idle state from the signal 803, which changes with the change in processing, and outputs the obtained periodical characteristics to the downstream power supply control information setting unit 104 as the periodical information 804. Similarly, the periodical information obtaining unit 802 obtains the periodical characteristics of the occurrence period Tvb of the idle state, and outputs the obtained periodical characteristics to the downstream power supply control information setting unit 104 as the periodical information 805.

Also, in order to realize the present embodiment, information relating to the occurrence period and occurrence interval of the idle state has to be obtained. Hereinafter, the way in which the periodical information obtaining unit 801 and the periodical information obtaining unit 802 recognize the occurrence period and occurrence interval of idle states that come around periodically will be described, taking the video signals shown in FIG. 6 and FIG. 7 as an example.

First, the occurrence period and occurrence interval of horizontal synchronization and vertical synchronization are not dependent on the processing capacity of the functional block that performs signal processing, and can be obtained from the video signal to be processed, angle of view, or the like. In other words, the start and end timing to be fulfilled by the image processing is decided in advance with respect to one iteration of horizontal processing and vertical processing. These pieces of information are transmitted respectively to the periodical information obtaining unit 801 and the periodical information obtaining unit 802 as the signal 803 having periodical characteristics, either directly from the video signal or by analysis of the video signal. Accordingly, the occurrence period and occurrence interval of the idle state can be acquired if the end timing of the substantive processing of the functional block that is to undergo power supply control can be specified.

As a first method of specifying the end timing of the substantive processing of a functional block that is to undergo power supply control, a configuration could conceivably be provided in which the functional block itself is able to transmit an end notification signal notifying the end of processing. The occurrence period and occurrence interval of the idle state can be derived if this end notification signal is transmitted to both the periodical information obtaining unit 801 and the periodical information obtaining unit 802 as one signal 803 having periodical characteristics.

Also, as a second method for specifying the end timing of the substantive processing of a functional block that is to undergo power supply control, the processing state of the functional block that is to undergo power supply control could conceivably be monitored. For example, the end of processing of the functional block can be specified by utilizing a direct method for obtaining information relating to the processing using a counter of the processed number of pixels or lines, or utilizing an indirect method such as monitoring the amount of current or the like. In the case where the end of processing can be specified, the occurrence period and occurrence interval of the idle state can similarly be derived if an end notification signal is transmitted to both the periodical information obtaining unit 801 and the periodical information obtaining unit 802 as one signal 803 having periodical characteristics.

Also, an inductive method such as providing a cycle in which the semiconductor integrated circuit is constantly activated without undergoing power supply control, at the beginning or once every few iterations of horizontal and vertical processing, and estimating the subsequent periodicity from the operating state during that cycle may be adopted, in association with a method of obtaining the occurrence period and occurrence interval of the idle state.

Next, an exemplary configuration of the power supply control information setting unit 104 shown in FIG. 1 will be described, with reference to FIG. 9. The power supply control information setting unit 104 is provided with a standby voltage determination unit 901 and a power supply control information holding unit 903, and a standby voltage determination unit 902 and a power supply control information holding unit 904, in order to enable setting of the standby voltage according to the two types of periodical information that were described with reference to FIG. 8.

Figure 8:
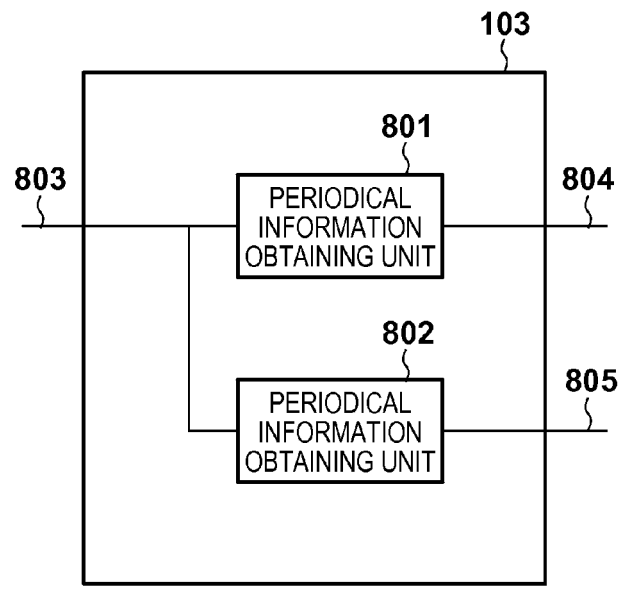
FIG. 8 is a diagram showing an exemplary configuration of a periodical information obtaining unit.
Figure 9:
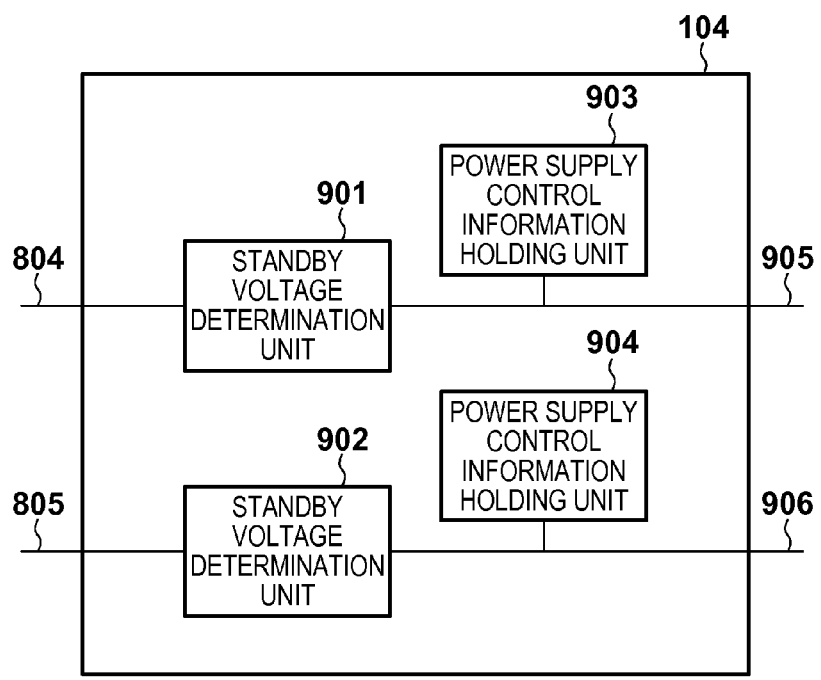
FIG. 9 is a diagram showing an exemplary configuration of a power supply control information setting unit.

Assume that processing having periodicity such as the operating mode A shown in FIG. 6 is executed, similarly to the description given in FIG. 8. In this case, the standby voltage determination unit 901 obtains the periodical information 804 from the periodical information obtaining unit 103, and determines the voltage V1 to be the standby voltage to be set with respect to the occurrence period Tha of the idle state and the occurrence interval ha of the idle state. The power supply control information setting unit 104 outputs information relating to the standby voltage determined by the standby voltage determination unit 901 to the power supply control unit 105 as power supply control information 905. Either a configuration in which the power supply control information 905 is temporarily held in the power supply control information holding unit 903, and read out from the power supply control information holding unit 903 and output as necessary, or a configuration in which the power supply control information 905 is output directly to the power supply control unit 105 may be adopted.

Similarly, the standby voltage determination unit 902 obtains the periodical information 805 from the periodical information obtaining unit 103, and determines that the voltage GND is the standby voltage to be set in relation to the occurrence period Tva of the idle state and the occurrence interval va of the idle state. The power supply control information setting unit 104 outputs information relating to the standby voltage determined by the standby voltage determination unit 901 to the power supply control unit 105 as power supply control information 906. Either a configuration in which the power supply control information 906 is temporarily held in the power supply control information holding unit 904, and read out from the power supply control information holding unit 904 and output as necessary, or a configuration in which the power supply control information 906 is output directly to the power supply control unit 105 may be adopted.

Also, assume that the processing is changed from processing having periodicity such as the operating mode A shown in FIG. 6 to the processing having periodicity such as the mode B shown in FIG. 7. In this case also, the power supply control information setting unit 104 is able to output, to the power supply control unit 105, information relating to the standby voltage obtained in relation to the occurrence period Thb of the idle state as the power supply control information 905, and information relating to the standby voltage obtained in relation to the occurrence period Tvb of the idle state as the power supply control information 906, using the same processing as the operations performed in the operating mode A.

Figure 10:
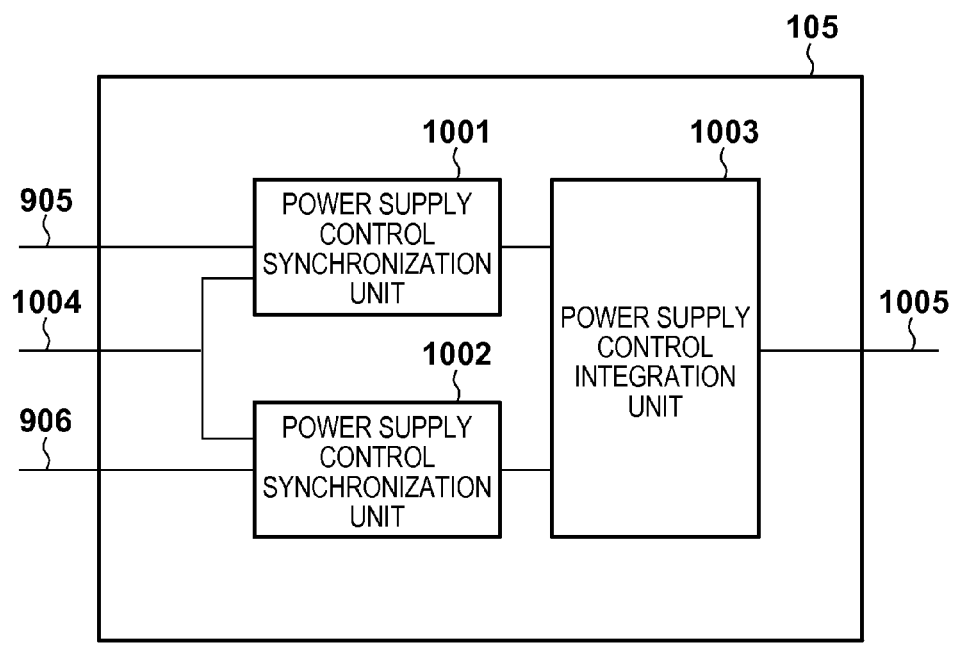
FIG. 10 is a diagram showing an exemplary configuration of a power supply control unit.

Furthermore, an exemplary configuration of the power supply control unit 105 shown in FIG. 1 will be described, with reference to FIG. 10. The power supply control unit 105 is provided with a power supply control synchronization unit 1001, a power supply control synchronization unit 1002, and a power supply control integration unit 1003. The power supply control synchronization unit 1001 obtains the power supply control information 905 and synchronous timing information 1004, and synchronizes setting of the standby voltage to the actual processing. Similarly, the power supply control synchronization unit 1002 obtains the power supply control information 906 and the synchronous timing information 1004, and synchronizes setting of the standby voltage to the actual processing. The power supply control integration unit 1003 integrates the individual pieces of power supply control information as power supply control information 1005 of the entire power supply domain, and outputs the integrated power supply control information to the power switch 106.

Here, the synchronous timing information 1004 is a reference timing signal that is utilized in processing of the power supply domain, and is a signal indicating the timing of a processing sequence such as those shown in FIG. 6 and FIG. 7. The synchronous timing information 1004 is used in order to decide the timing for the power supply control synchronization units 1001 and 1002 to assert or negate the power supply control information 905 and 906, with respect to processing that is proceeding in real time. Assume that processing having periodicity such as the operating mode A shown in FIG. 6 is executed, similarly to the description given in FIG. 8. In this case, the power supply control synchronization unit 1001 synchronizes the power supply control information 905 relating to the occurrence period Tha of the idle state to the timing of the occurrence interval ha of the idle state in accordance with the synchronous timing information 1004 indicating the real-time timing of the actual processing, and outputs the synchronized power supply control information to the power supply control integration unit 1003.

Similarly, the power supply control synchronization unit 1002 synchronizes the power supply control information 906 relating to the occurrence period Tva of the idle state to the timing of the occurrence interval va of the idle state in accordance with the synchronous timing information 1004, and outputs the synchronized power supply control information to the power supply control integration unit 1003. The power supply control integration unit 1003 integrates the two pieces of power supply control information synchronized to the actual processing, and outputs the integrated power supply control information to the power switch 106 as the power supply control information 1005 of the entire power supply domain.

Also, assume that the processing is changed from processing having periodicity such as the operating mode A shown in FIG. 6 to processing having periodicity such as the mode B shown in FIG. 7. In this case also, the contents of the power supply control information 905 and the power supply control information 906 are updated, following the change in the occurrence period Tha of the idle state to the occurrence period Thb, the change in the occurrence interval ha to the occurrence interval hb, the change in the occurrence period Tva to the occurrence period Tvb, and the change in the occurrence interval va to the occurrence interval vb. At the same time, the synchronous timing information 1004 is also updated to that of the operating mode B. Thus setting of the standby voltages can be changed without disrupting the processing.

Note that because image processing was taken as an example in the above description, a configuration was shown in which two systems for obtaining power supply control information were provided in the periodical information obtaining unit 103 and the power supply control information setting unit 104, and the application timings of the standby voltages were integrated in the power supply control unit 105. However, even if a single system or three or more systems for obtaining power supply control information are provided, the appropriate application timing of the standby voltages can be set by similarly acquiring individual pieces of power supply control information.

Also, in relation to the standby voltages and the number of switches in the power gating circuit 401, an example was given of the standby voltages and the number of switches in the case where image processing was taken as an example, and the standby voltages and the number of switches are not restricted.

As described above, a power supply control apparatus for controlling the voltage of a power supply domain of a semiconductor integrated circuit that performs processing by periodically repeating a processing state and a standby state obtains periodical characteristics information of the processing, and sets a standby voltage that is associated in advance with that periodical characteristics information according to the length of the recovery time from the standby voltage of the standby state as power supply control information, and controls the standby voltage of the power supply domain in accordance with that power supply control information.

Even with a semiconductor integrated circuit that handles processing of diverse signal standards, power supply control tailored to an idle state in which an idle occurrence period and occurrence interval change with differences between various periodicities can be applied, and an effect of sufficiently reducing power consumption can be acquired.

Second Embodiment

The configuration of a power supply control mechanism according to a second embodiment that is for controlling the power supply of a semiconductor integrated circuit will be described, with reference to FIG. 11. The power supply control mechanism according to the present embodiment is provided with a power supply controller 101, a power supply domain 102 and a power switch 106, similarly to the first embodiment. A difference from the first embodiment is that the power supply controller 101 is further provided with a recovery time measurement unit 1101 that measures the recovery time from the standby voltage of the power supply domain 102. Note that the same reference numerals are given to configuration that is similar to the first embodiment, and description is omitted.

Since production variations exist between semiconductor integrated circuits, it is possible that when a uniform recovery time is set, there could be semiconductor integrated circuits that cannot operate at that setting. In view of this, in the present embodiment, a configuration is adopted in which a recovery time unique to individual semiconductor integrated circuits is measured by the recovery time measurement unit 1101, and information on the measured recovery time is reflected in the setting of the standby voltage using the power supply control information setting unit 104. Standby voltages appropriate to individual semiconductor integrated circuits can thereby be set, and adjustment carried out so that there are no inoperable semiconductor integrated circuits.

An example of the internal configuration of the recovery time measurement unit 1101 and the peripheral configuration of the recovery time measurement unit 1101 will be described, with reference to FIG. 12.

Figure 12:
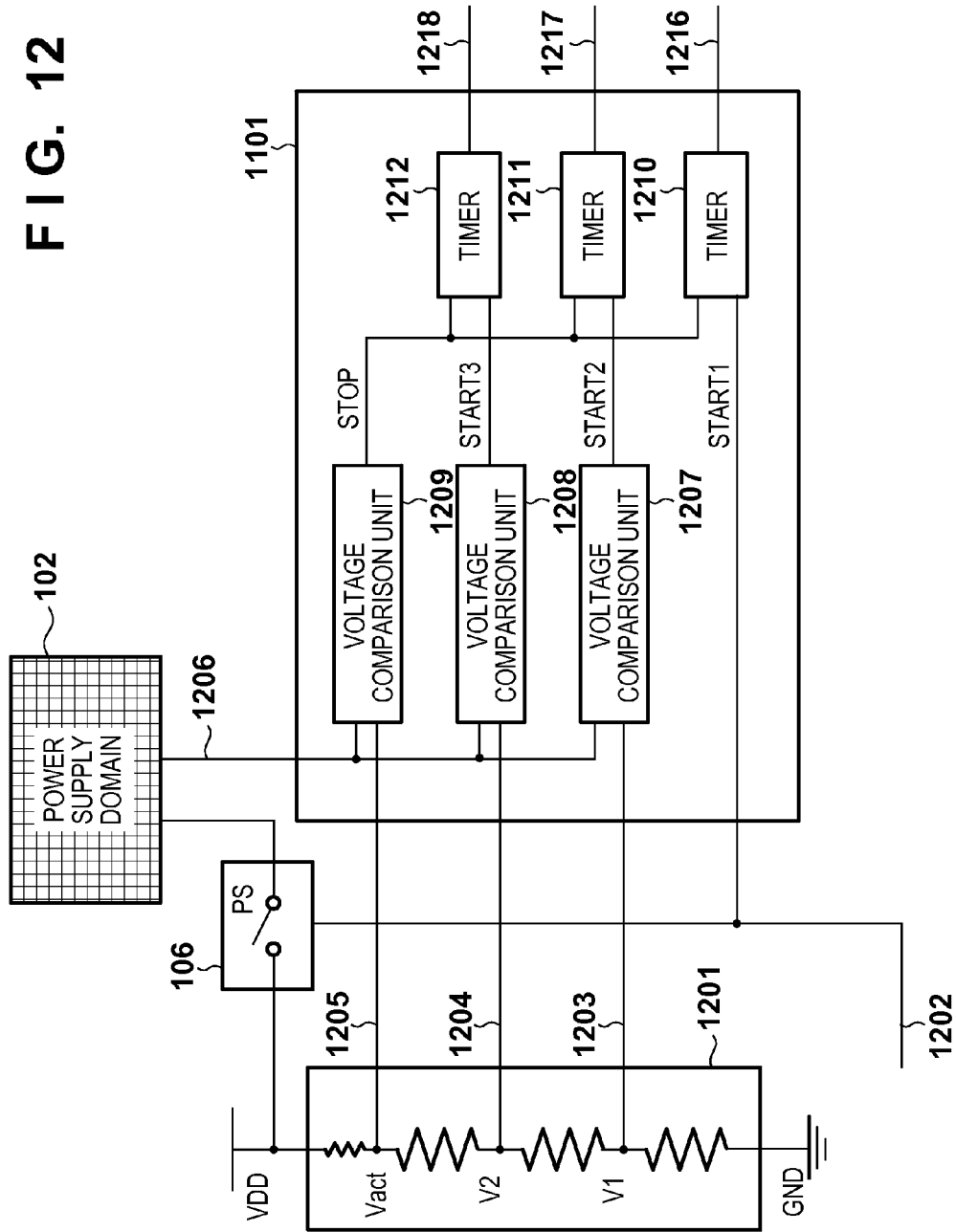
FIG. 12 is a diagram showing an exemplary configuration of a recovery time measurement unit.

In FIG. 12, a reference voltage generation unit 1201 generates the voltages V1, V2 and Vact of the three states shown in FIG. 6 and FIG. 7. The individual voltages generated by the reference voltage generation unit 1201 are referred to by a voltage comparison unit 1207, a voltage comparison unit 1208 and a voltage comparison unit 1209 which will be discussed later. Although the reference voltage generation unit 1201 is not included in the recovery time measurement unit 1101 since the configuration method, disposition method and the like are not uniform, a configuration in which the recovery time measurement unit 1101 includes the reference voltage generation unit 1201 may be adopted.

The power switch 106 supplies a power supply voltage VDD to the power supply domain through the switch PS1 in accordance with power supply application information 1202 that is input.

In FIG. 12, the recovery time measurement unit 1101 obtains reference information on the recovery time with single path measurement as one example of the form of recovery time measurement. The recovery time measurement unit 1101 is provided with a voltage comparison unit 1207, a voltage comparison unit 1208, a voltage comparison unit 1209, a timer 1210, a timer 1211, and a timer 1212.

The voltage comparison unit 1207, the voltage comparison unit 1208 and the voltage comparison unit 1209 each probe a reference node 1206 of the power supply domain voltage using one sense terminal. The voltage comparison unit 1207 probes a reference node 1203 of the voltage V1 using another sense terminal, and, if the power supply domain voltage exceeds V1, notifies "Start 2" indicating a start signal to the timer 1211. The voltage comparison unit 1208 probes a reference node 1204 of the voltage V2 using another sense terminal, and, if the power supply domain voltage exceeds V2, notifies "Start 3" indicating a start signal to the timer 1212.

The power supply application information 1202 is notified to the timer 1210 as "Start 1" indicating a start signal. The voltage comparison unit 1209 probes a reference node 1205 of the voltage Vact using another sense terminal, and, if the power supply domain voltage exceeds Vact, notifies "Stop" indicating a stop signal to the timer 1210, the timer 1211 and the timer 1212. Measurement by each timer thereby ends. The measured values of the timers are respectively output to the power supply control information setting unit 104, as information 1216 indicating the recovery time from power shutdown, information 1217 indicating the recovery time from the voltage V1, and information 1218 indicating the recovery time from the voltage V2.

Figure 13:
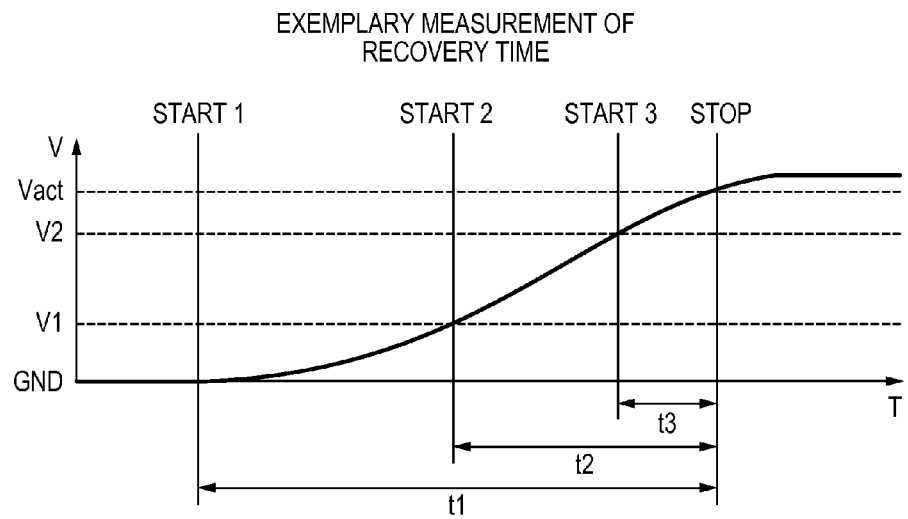
FIG. 13 is a diagram showing a timing chart illustrating a single path estimate of recovery time.

A situation will be described in which the timers included in the recovery time measurement unit 1101 of FIG. 12 start counting sequentially, and all of the timers end measurement simultaneously at the point at which Vact is exceeded, with reference to FIG. 13. The voltage V on the vertical axis increases to V1 and V2 from GND with the passage of time T on the horizontal axis, and becomes a constant voltage after exceeding Vact. Time t1 from Start 1 to Stop is the information 1216 indicating the recovery time from power shutdown. Similarly, Time t2 from Start 2 to Stop is the information 1217 indicating the recovery time from the voltage V1, and Time t3 from Start 3 to Stop is the information 1218 indicating the recovery time from the voltage V2.

Note that the configuration of the recovery time measurement unit 1101 is not limited to single path measurement. Also, the configuration is not dependent on the measurement method, and the recovery time may be measured individually from each standby state or may be re-measured from the actual standby state at the time of recovery. At this time, the configuration is changed such that the voltage comparison units and the timers are shared or multiplexed in accordance with the measurement method adopted. Also, the probe location may be the minimum voltage portion, or a plurality of recovery time measurement units 1101 may be installed in a plurality of locations and the portion with the slowest recovery may be employed.

Figure 14:
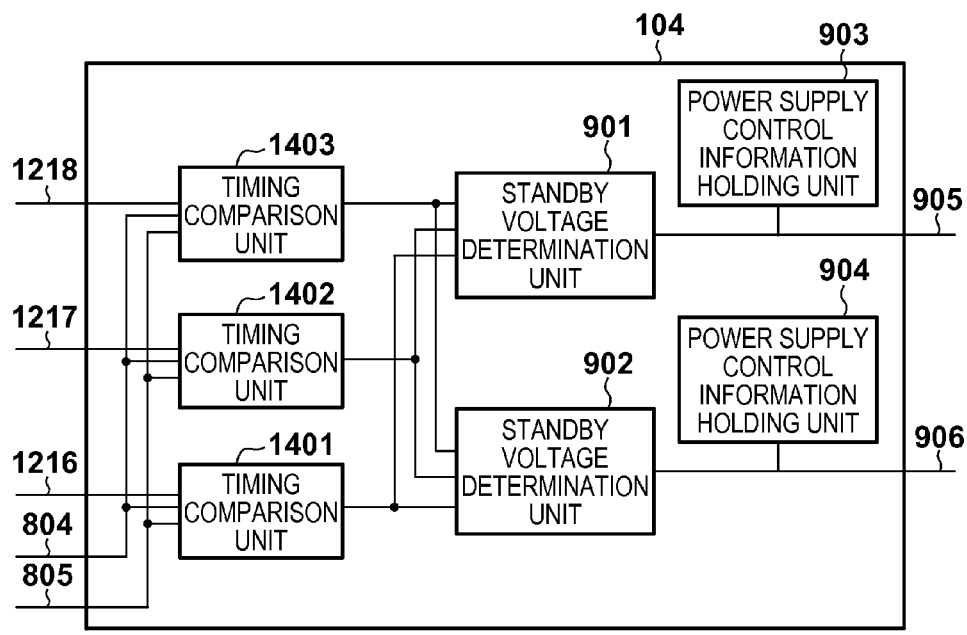
FIG. 14 is a diagram showing an exemplary configuration of a power supply control setting unit used in conjunction with the recovery time measurement unit.

The configuration of the power supply control information setting unit 104 according to the second embodiment will be described, with reference to FIG. 14. In addition to the configuration of the power supply control information setting unit 104 described with reference to FIG. 9, the power supply control information setting unit 104 according to the second embodiment is further provided with a timing comparison unit 1401, a timing comparison unit 1402, and a timing comparison unit 1403.

The timing comparison unit 1401 compares information 1216 indicating the recovery time from power shutdown obtained from the recovery time measurement unit 1101 with the periodical information 804 and the periodical information 805 obtained from the periodical information obtaining unit 103, and determines whether recovery from power shutdown is possible within the standby times thereof. The timing comparison unit 1402 compares information 1217 indicating the recovery time from the voltage V1 obtained from the recovery time measurement unit 1101 with the periodical information 804 and the periodical information 805 obtained from the periodical information obtaining unit 103, and determines whether recovery is possible from the voltage V1 within the standby times thereof. The timing comparison unit 1403 compares information 1218 indicating the recovery time from the voltage V2 obtained from the recovery time measurement unit 1101 with the periodical information 804 and the periodical information 805 obtained from the periodical information obtaining unit 103, and determines whether recovery is possible from the voltage V2 within the standby times thereof.

The standby voltage determination unit 901 and the standby voltage determination unit 902 set the lowest of the standby voltages with respect to which recovery is determined to be possible as the standby voltage, which serves as power supply control information. Since the subsequent processing is similar to the first embodiment, description is omitted.

According to the present embodiment, the effect of sufficiently reducing power consumption can be acquired by appropriately selecting the recovery time, while responding to variations between individual semiconductor integrated circuits.

Third Embodiment

Figure 15:
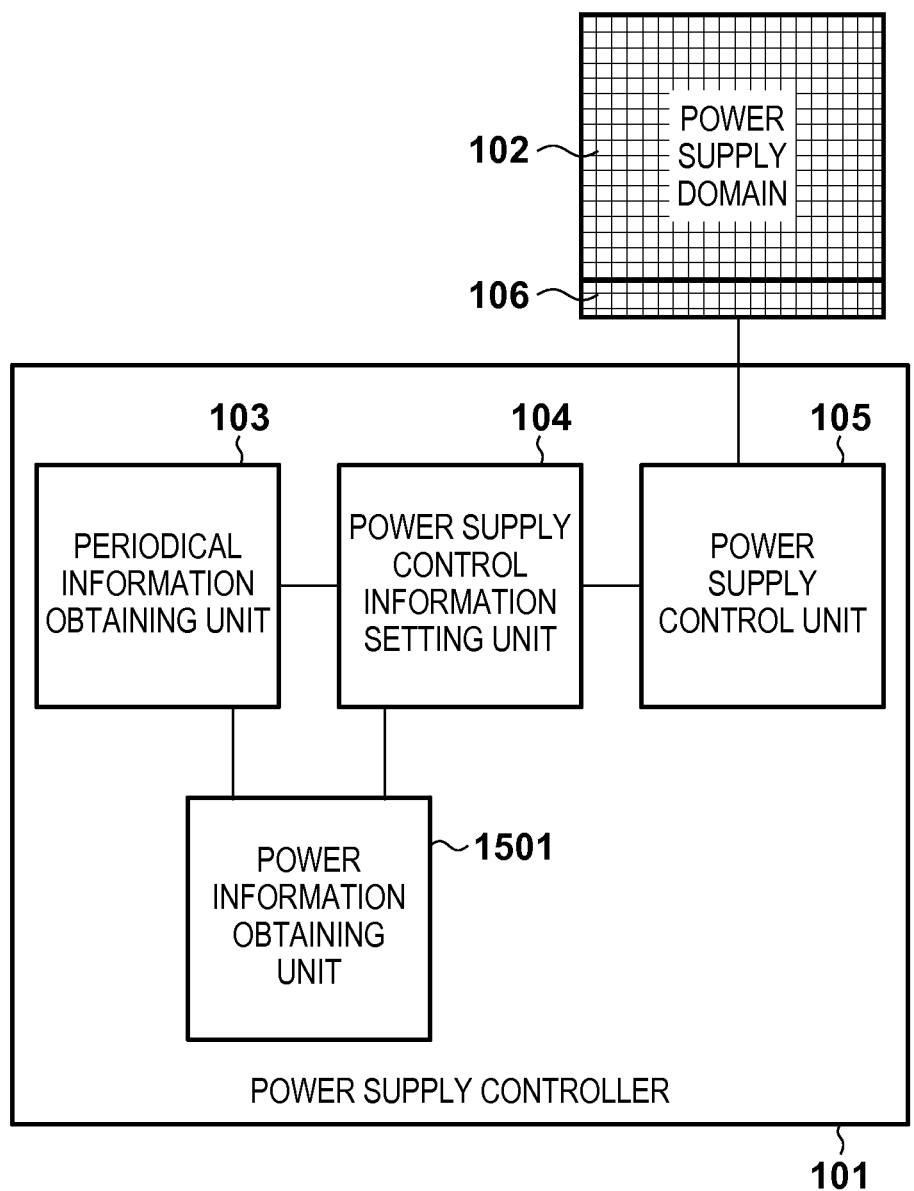
FIG. 15 is a diagram showing a configuration of a power supply control mechanism according to a third embodiment.

The configuration of a power supply control mechanism according to a third embodiment that is for controlling the power supply of a semiconductor integrated circuit will be described, with reference to FIG. 15. The power supply control mechanism according to the present embodiment is provided with a power supply controller 101, a power supply domain 102, and a power switch 106, similarly to the first embodiment. A difference from the first embodiment is that the power supply controller 101 is further provided with a power information obtaining unit 1501 that obtains information relating to power of the power supply domain 102. Note that the same reference numerals are given to configuration that is similar to the first embodiment, and description is omitted.

It may not be possible to take account of power following the power switch being turned on, when the standby voltage is decided with the sole purpose of simply satisfying the recovery time, from the viewpoint of reducing leakage current. In view of this, in the present embodiment, a configuration is described in which total power is minimized with consideration for both power produced when the power switch is turned on and leakage power in the standby voltage settings.

Figure 16:
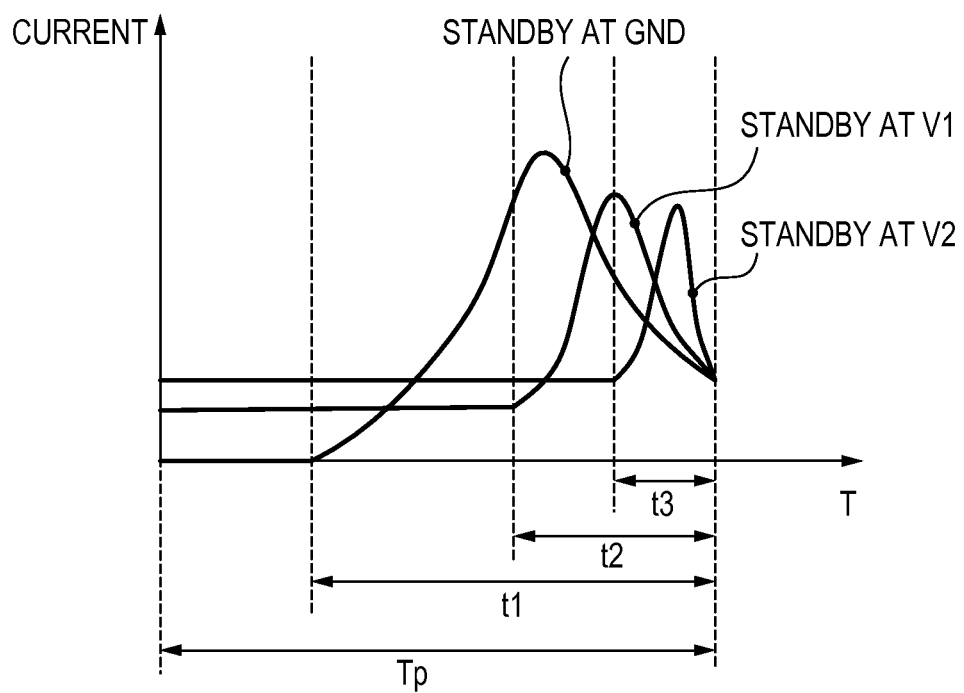
FIG. 16 is a diagram showing the change in current from a standby state to immediately before the start of operation.

The total of power associated with leakage of current and power associated with the power switch being turned ON will be described, with reference to FIG. 16. The vertical axis is current and the horizontal axis is time T. FIG. 16 shows the current change from standby states until immediately before the start of operation during an identical standby time Tp that satisfies the recovery times t1, t2 and t3 from the voltages GND, V1 and V2.

In the curves in FIG. 16, the flat portion until the switch is turned ON represents the leakage current at each standby voltage, with the leakage current being smallest in the case of standing by at GND and being largest in the case of standing by at V2.

Also, the area of the peak appearing in each curve is the power that will be charged from a state in which the power switch is OFF or a standby state to an operable state, and is largest in the case of standing by at GND and smallest in the case of standing by at V2.

Total power until the operable state is attained from the standby states is respectively given by the integrals of the curves in FIG. 16, and the most effective power saving is enabled by choosing the standby state indicating the lowest power during the standby time Tp. Here, the relationship of equation (5) is established, where powers Pg, Pv1 and Pv2 are respectively the total power in the case of recovery from the voltages GND, V1 and V2 during the standby time Tp.

$$Pv1 < Pg < Pv2 \quad (5)$$

In this case, the standby voltage that enables power saving premised on the standby time Tp will be V1 rather than GND.

Figure 17:
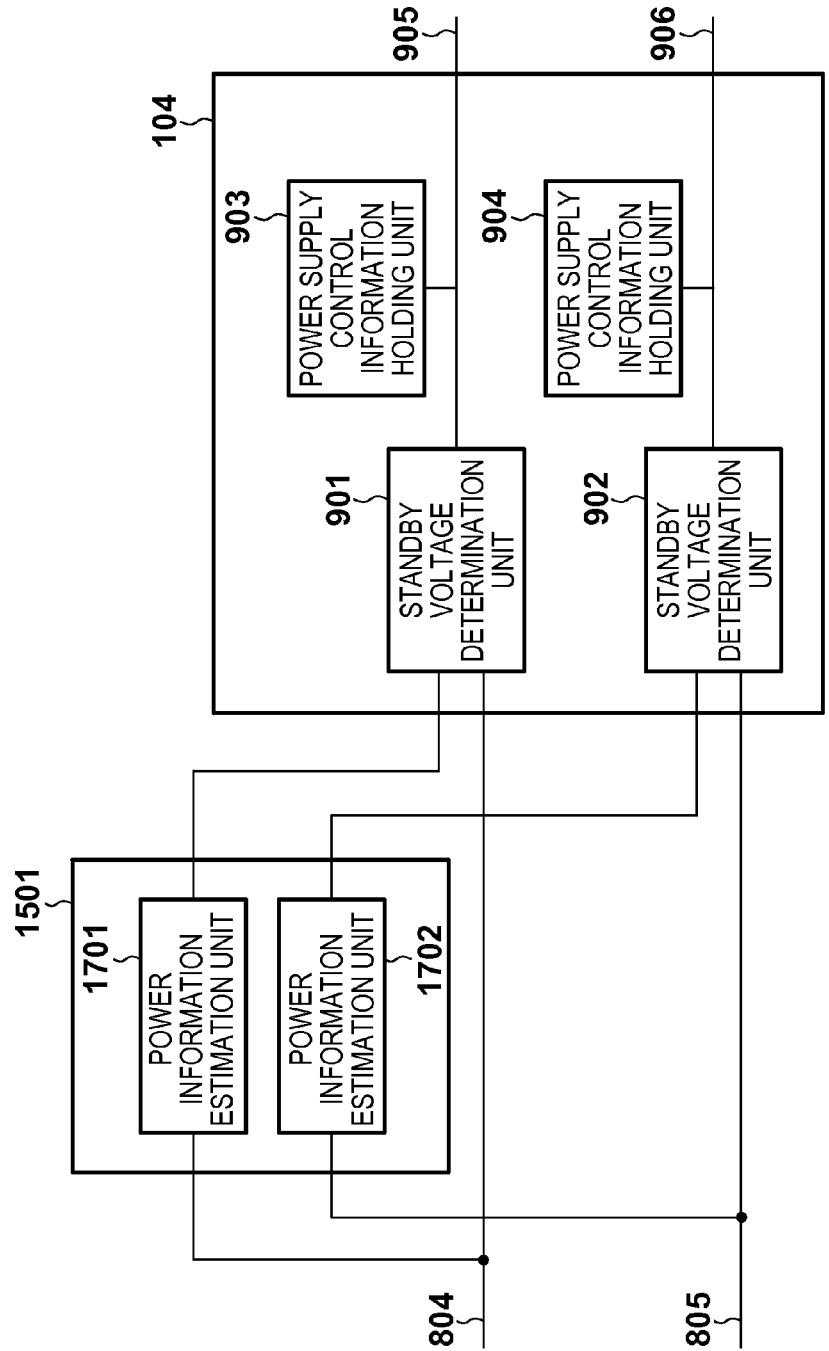
FIG. 17 is a diagram showing an exemplary configuration of a power information obtaining unit.

The configuration of the power information obtaining unit 1501 shown in FIG. 15 and the configuration of the power supply control information setting unit 104 compatible with the power information obtaining unit 1501 will be described, with reference to FIG. 17.

The power information obtaining unit 1501 is provided with a power information estimation unit 1701 and a power information estimation unit 1702.

For example, the power information estimation unit 1701 estimates leakage power and power following the power switch being turned ON, based on several standby voltage candidates that could be employed in the standby state, and a standby duration acquired using the periodical information 804. Information on the power component estimated by the power information estimation unit 1701 is transmitted to the standby voltage determination unit 901. The standby voltage determination unit 901 determines the standby voltage such that the standby voltage candidate having the smallest estimated value of total power among the standby voltage candidates that satisfy the recovery time is set as the standby voltage.

Similarly, the power information estimation unit 1702 estimates leakage power and power following the power switch being turned ON, based on several standby voltage candidates that could be employed in the standby state and a standby duration acquired using the periodical information 805. Information on the power component estimated by the power information estimation unit 1702 is transmitted to the standby voltage determination unit 902. The standby voltage determination unit 902 determines the standby voltage such that the standby voltage candidate having the smallest estimated value of total power among the standby voltage candidates that satisfy the recovery time is set as the standby voltage. Since the subsequent processing is similar to the first embodiment, description is omitted. Note that a configuration may be adopted in which the power information obtaining unit 1501 obtains information on the power component by actually measuring the power of the power supply domain.

In this way, the power information obtaining unit 1501 obtains information on power consumed when a semiconductor integrated circuit changes from a standby state to an operational state for each standby voltage candidate, and the power supply control information setting unit 104 sets, as power supply control information, the standby voltage at which the recovery time is shorter than the occurrence period of the standby state and power consumption is minimized.

The present embodiment enables reduction of total power consumption including not only leakage power but also power at the time of recovery from a standby state.

The present invention enables power supply control tailored to an idle state whose timing and duration changes with differences between various periodicities and realization of low power consumption, in a semiconductor integrated circuit that handles processing of diverse signal standards.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-233262 filed on Oct. 24, 2011, which is hereby incorporated by reference herein in its entirety.

What is claimed is:

1. A semiconductor integrated circuit provided with a processing unit that repeats a processing state and a standby state, comprising:
   an obtaining unit configured to obtain a period of the standby state as a standby period;
   a control unit configured to hold a plurality of candidate voltages in association with pieces of recovery information corresponding to recovery times required for the processing unit to return to a normal operation voltage from the candidate voltages in the standby state, and to control a standby voltage of the processing unit in the standby state in accordance with the candidate voltage associated with the piece of recovery information corresponding to a recovery time that is shorter than the standby period among the plurality of candidate voltages; and a power information estimation unit configured to estimate leakage power of the plurality of candidate voltages and power following an activation from the plurality of candidate voltages, based on the plurality of candidate voltages and the standby period, wherein said control unit further controls the standby voltage to save total power of both leakage power of the plurality of candidate voltages and power following an activation from the plurality of candidate voltages estimated by said power information estimation unit.

2. The semiconductor integrated circuit according to claim 1, further comprising an input unit configured to input a video signal, and comprising said processing unit, wherein said processing unit targets the video signal for processing, and said obtaining unit obtains a first standby period in which a standby state relating to first processing occurs and a second standby period in which a standby state relating to second processing occurs, based on the video signal input by said input unit, and obtains the standby period of the standby state of said processing unit by integrating the first standby period and the second standby period.

3. The semiconductor integrated circuit according to claim 1, wherein said obtaining unit calculates a current of the processing unit, and obtains the standby period based on the current.

4. The semiconductor integrated circuit according to claim 1, wherein said obtaining unit monitors the processing state of the processing unit, and obtains the standby period based on the monitored processing state.

5. The semiconductor integrated circuit according to claim 1, wherein at the time of obtaining of the standby period by said obtaining unit, switching is prevented to a voltage other than the normal operation voltage by the control unit.

6. A control method of a semiconductor integrated circuit provided with a processing unit that repeats a processing state and a standby state, comprising:

obtaining a period of the standby state as a standby period;

holding a plurality of candidate voltages in association with pieces of recovery information corresponding to recovery times required for the processing unit to return to a normal operation voltage from the candidate voltages in the standby state, and controlling a standby voltage of the processing unit in the standby state in accordance with the candidate voltage associated with the piece of recovery information corresponding to a recovery time that is shorter than the standby period among the plurality of candidate voltages; and estimating leakage power of the plurality of candidate voltages and power following an activation from the plurality of candidate voltages, based on the plurality of candidate voltages and the standby period, wherein said controlling further includes controlling the standby voltage to save total power of both leakage power of the plurality of candidate voltages and power following an activation from the plurality of candidate voltages estimated in said estimating step.

* * * * *